June 15, 1965 A. FELLER 3,189,757

LOGIC CIRCUIT

Filed Nov. 24, 1961

INVENTOR.
ALBERT FELLER
BY John V. Regan
Attorney 3,189,757
Patented June 15, 1965

3,189,757
LOGIC CIRCUIT

Albert Feller, Riverton, N.J., assignor to Radio Corporation of America, a corporation of Delaware Filed Nov. 24, 1961, Ser. No. 154,571
4 Claims. (Cl. 307—88.5)

Figures 1, 2:
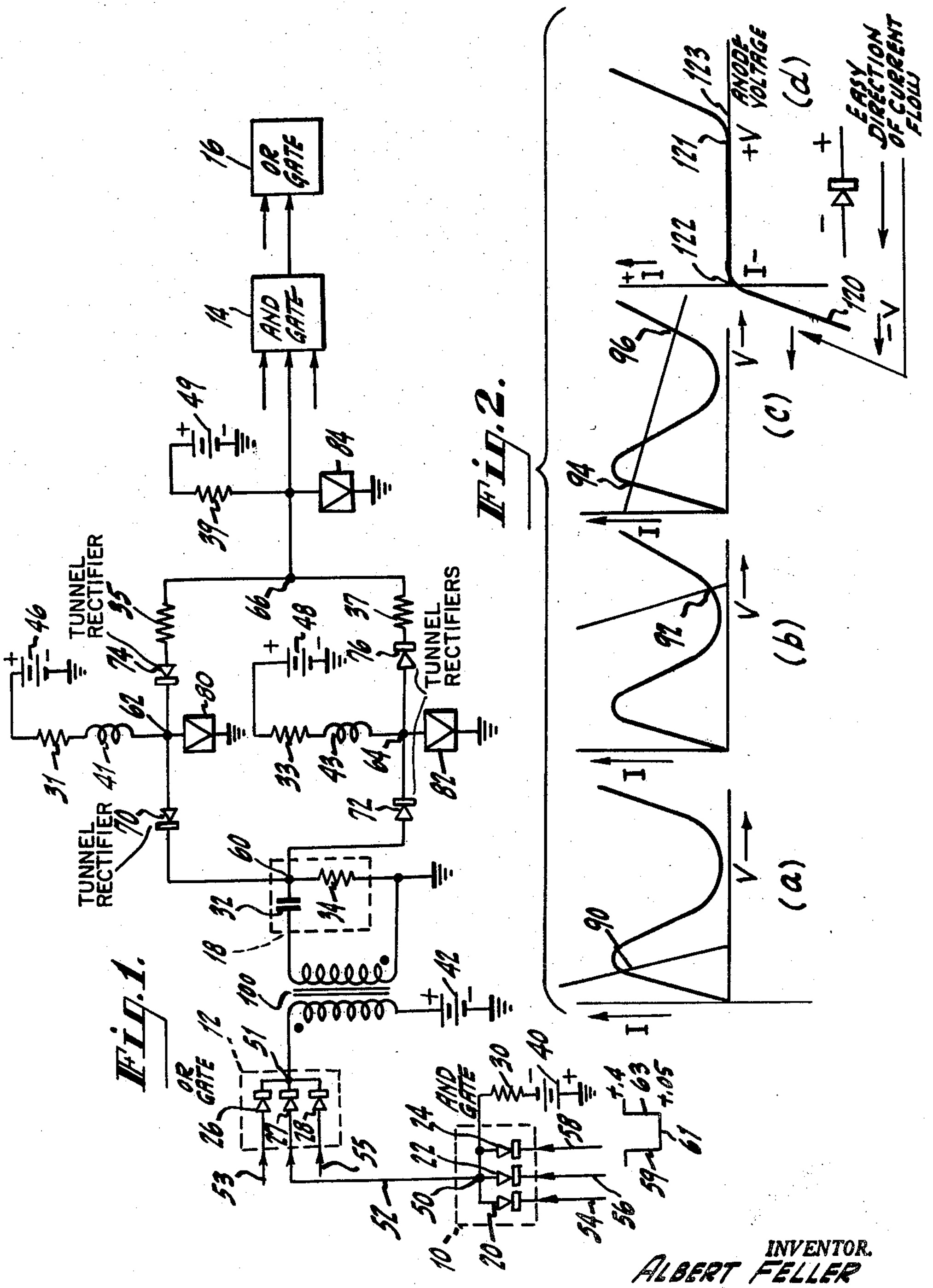

This invention relates to a logic circuit, and more particularly to a high speed logic circuit employing negative resistance elements.

The various operations performed in digital apparatus include, for example, logical gating, switching and storage of information signals. Many of these operations may be carried out by employing circuit "modules" of similar type interconnected to one another in various ways.

It is an object of this invention to provide a new and improved circuit module such as discussed above.

It is another object of this invention to provide an improved logic circuit which is useful in a data processing system such as a digital computer.

It is another object of this invention to provide an improved self-resetting circuit which is capable of relatively high speed operation.

These and other objects are accomplished according to one form of the invention by a circuit which includes three negative resistance elements such as tunnel diodes. Two of the diodes are monostably biased, one to its low voltage positive resistance operating region and the other to its high voltage positive resistance operating region, and the third diode is bistably biased. The bistably biased negative resistance diode is coupled to the monostability biased negative resistance diodes. The latter are switched in succession to switch the bistably biased diode from one of its stable operating regions to its other, and then from its other stable operating region back to its one stable region.

The invention is described in greater detail below and is illustrated in the following drawing in which:

FIGURE 1 is a block and schematic circuit diagram of one form of the invention; and, FIGURES 2*a*–2*d* are current-versus-voltage characteristics which are useful in explaining the operation of the circuit of FIGURE 1.

Referring to FIGURE 1, a diode "and" gate 10 includes tunnel rectifiers 20, 22 and 24 which are connected at their cathodes to input leads 54, 56 and 58, respectively, and at their anodes to common output terminal 50. A voltage source, shown as battery 40, is connected at its negative terminal through resistor 30 to terminal 50 and at its positive terminal to a point of reference potential, shown as ground. The "and" gate 10 is used to couple three input signals to the logic circuit so that the common terminal changes from a normally high to a low level when and only when all the input signals are present at the same time. These input signals may be applied from any suitable sources, for example, other logic circuits.

The output terminal 50 of gate 10 is coupled to a diode "or" gate 12 through lead 52. Gate 12 comprises tunnel rectifiers 26, 27 and 28 which are connected at their anodes to input leads 53, 52 and 55, respectively, and at their cathodes to a common output terminal 51. Input leads 53 and 55 may be connected to gates (not shown) similar to gate 10 or to other logic circuits (not shown). The combination of "and"-"or" diode gates to a further logic circuit is a common logic circuit arrangement in digital apparatus.

Output terminal 51 is connected through the primary winding of transformer 100 to the positive terminal of a source of bias potential, shown schematically as a battery 42. The negative terminal of the battery is connected to ground potential. The secondary winding of transformer 100 is connected at one terminal to differentiating circuit 18 which comprises capacitor 32 and resistor 34. The other terminal of the secondary winding of transformer 100 is connected to ground.

The output of the differentiating circuit 18, taken at junction point 60, is applied to the logic circuit tunnel diodes 80 and 82 through tunnel rectifiers 70 and 72, respectively. Tunnel rectifiers 70 and 72 are connected to junction point 60 at their cathods and anode, respectively. Tunnel diode 80 is quiescently monostably biased in the low voltage, high-current state as illustrated in FIGURE 2*a*. The diode 80 biasing means, shown as a batery 46, is connected at its negative terminal to ground and its positive terminal to the anode of tunnel diode 80 through resistor 31 and inductor 41. Tunnel diode 82 is quiescently monostably biased in its high voltage, low-current state, as shown in FIGURE 2*b*. The diode 82 biasing means, shown as a battery 48, is connected at its positive terminal to the anode of the tunnel diode through resistor 33 and inductor 43. The negative terminal of battery 48 is connected to ground.

The output of tunnel diode 80 is taken at junction point 62 and is coupled through a series circuit, comprising tunnel rectifier 74 and resistor 35, to the third tunnel diode 84. The cathode of tunnel rectifier 74 is connected to junction point 62. In a similar manner, the output terminal 64 of tunnel diode 82 is coupled to the third tunnel diode 84 through tunnel rectifier 76 and resistor 37. The anode of tunnel rectifier 76 is connected to the anode of tunnel diode 82.

Tunnel diode 84 is biased for bistable operation by a bias potential source, shown as battery 49. The latter is connected at its negative terminal to ground and at positive terminal to the anode of tunnel diode 84 through resistor 39. The output of tunnel diode 84 is applied to one input of a diode "and" gate 14, similar to input "and" gate 10, and the output of gate 14 is applied to one input of a diode "or" gate 16, which is similar to input "or" gate 12.

In operation, tunnel rectifiers 20, 22 and 24 of input "and" gate 10 are quiescently biased to an extent such that they conduct. (The return circuits for the cathodes are not shown but each may be through a circuit such as 84, 39, 49 in FIGURE 1.) The quiescent voltage at the anodes may in this case be +.4 volt when germanium tunnel diodes are used in the logic circuit. Preferably germanium tunnel rectifiers are also used as gating and coupling elements for the germanium tunnel diodes. The quiescent voltage at the cathodes may be approximately the same value. The operating point of each rectifier may be a point such as 120 in FIGURE 2*d*.

If now the voltage applied to input leads 54, 56 and 58 is driven in the negative direction to say +.05 volt, corresponding to the leading edge 59 of signal 61, the operating point of each rectifier is driven from a point such as 120 to a point such as 121 in FIGURE 2*d*. The effect is to drive all rectifiers 20, 22 and 24 to cut-off. (Note that at operating point 121, FIGURE 2*d*, the rectifier draws substantially no current.) The voltage at the anodes of the rectifiers 20, 22 and 24 now drops from its former value of +.4 to a more negative value such as +.05 volt.

When any one of the rectifiers 20, 22 or 24 conducts, the voltage at point 50 applied to rectifier 27 is sufficiently low so that the rectifier 27 of the "or" circuit 12 operates in its high resistance region 122, 123 (FIGURE 2*d*). In other words, the voltage between the positive terminal of battery 42 and terminal 50 is such that the tunnel rectifier 27 is forward biased and conducts substantially no current. However, when all rectifiers in gate 10 are cut-off, the voltage at terminal 50 decreases to a value such that rectifier 27 becomes reverse biased, that is, biased in the direction of easy current flow, for example, corresponding to the point 120 of FIGURE 2*d*. Now the current from source 42 passes through the primary winding of the transformer 100, rectifier 27, resistor 30, battery 40 and back to source 42 via the common ground.

The current flow through the primary winding of transformer 100 induces a voltage across, and current flow through the secondary winding of transformer 100.

Transformer 100 is a high frequency, step-up current transformer which may have a realizable current gain of about 2 to 2.5 at 1 nanosecond rise time. As the primary and secondary windings are oppositely wound, the currents through the two windings flow in opposite directions. In the case of a direct current negative step wave applied to the transformer, the current through the secondary closely follows the step of the wave producing a positive step at 18. If the current through the primary should remain constant at its new value, the current through the secondary would gradually reduce to zero. The time constant of the differentiating circuit is such that this circuit produces a positive pulse in response to the positive step at 18 (a sudden increase in current through the secondary winding), but substantially no output pulse in response to the gradual decrease in current through the secondary winding.

The positive pulse from differentiating circuit 18 passes through the rectifier 70 in its easy current direction, and switches tunnel diode 80 to its high state—its unstable positive resistance operating region. As the current through the inductor 41 cannot instantaneously change, the current instantaneously available at point 62 is the sum of the current passing through the inductor and the current from rectifier 70. The voltage at terminal 62 is now such that rectifier 74 is biased in the reverse or easy direction of current flow (point 120, FIGURE 2*a*), and part of the current available at terminal 62 steers through rectifier 74 and switches tunnel diode 84 to its high state.

If the voltage applied to any one of the input leads 54, 56 and 58 of gate 10 is driven in the positive direction to say .4 volt, corresponding to the trailing edge 63 of signal 61, the operating point of the rectifier 20, 22 or 24 to which this positive going signal is applied, is driven from a point such as 120 in FIGURE 2*d*. The voltage at terminal 50 applied to rectifier 27 is then sufficiently low so that tunnel rectifier 27 conducts substantially no current.

Assuming that rectifiers 26 and 28 are cut-off, at the time rectifier 27 is driven to cut-off, the current flow through the primary winding 100 drops to substantially zero. The decrease in current flow through the primary winding of transformer 100 induces a voltage, and a resultant current flow through the secondary winding of the transformer. The differentiating circuit 18 produces a negative pulse in response to this change of current flow through the secondary winding, which is applied to rectifier 72 in its easy current direction. The flow of current through the secondary gradually reduces to zero. The differentiating circuit 18 produces practically no output pulse in response to this gradual decrease in current.

A low value of current from source 48 normally flows through inductor 43 and into tunnel diode 82 as shown at operating point 92, FIGURE 2*b*. When the negative pulse is applied to the anode of tunnel rectifier 72, it switches tunnel diode 82 to its low voltage state—its unstable positive resistance operating region. The current in the inductor, however, remains at its same low value for a short interval. It is believed that more current flows through the rectifier 72 than is available from the inductor 43. The difference current is believed to come from the capacity of tunnel diode 82 discharging in those regions in which diode 82 exhibits a negative resistance. However, regadless of whether or not this theory is correct, tunnel diode 82 does switch to the low state, as stated. The voltage at terminal 64 is now such that rectifier 76 is biased in its easy direction of current flow (point 120, FIGURE 2*a*). Now part of the current available from source 49 and formerly passing into tunnel diode 84 steers through rectifier 76 and into tunnel diode 82 and tunnel rectifier 72. The current remaining available for tunnel diode 84 is lower than its valley current so that the tunnel diode 84 resets to its low state—its original condition.

The circuit described is an extremely flexible circuit in which the tunnel rectifiers act as logic stages and provide the required isolation, and the tunnel diodes provide the gain necessary for fan out. The circuit can operate as a D.C. logic circuit and requires no external reset pulse. It is capable of relatively high speed operation having no more than four nanoseconds delay per level of logic with tunnel diodes having 3 to 5 picofarads/milliamps. However, with tunnel diodes of smaller intrinsic capacitance, the delay per level of logic may be reduced to a substantially smaller value than four nanoseconds.

A typical circuit according to the invention may employ the following values of circuit components:

*Tunnel diodes*

| | |
|---|---|
| 80 | Germanium, 10 ma. peak current |
| 82 | Germanium, 10 ma. peak current |
| 84 | Germanium, 20 ma. peak current |

*Inductors*

| | Microhenries |
|---|---|
| 41 | .11 |
| 43 | .11 |

*Resistors*

| | Ohms |
|---|---|
| 31 | 20 |
| 33 | 20 |
| 39 | 620 |

*Batteries*

| | Volts |
|---|---|
| 46 | 0.2 |
| 48 | 0.4 |
| 49 | 10 |

Although tunnel diode 84 has been shown quiescently biased in its low voltage state, a circuit in accordance with the invention may be arranged to change the state of tunnel diode 84 from its high to its low voltage state, and then to be reset to its high voltage state.

What is claimed is:

1. An electrical circuit comprising in combination,
first, second, and third tunnel diodes each exhibiting a high and a low voltage operating state,
means for biasing said first tunnel diode to operate monostably in said low voltage state,
means for biasing said second tunnel diode to operate monostably in said high voltage state,
means for biasing said third tunnel diode to operate bistably in both said high and said low voltage states,
means for switching, in succession, said first and second tunnel diodes to said high and low voltage states, respectively,
said biasing means returning said first and second tunnel diodes to said low and high voltage states, respectively, so that said first and second tunnel diodes produce a positive-going pulse and a negative-going pulse, respectively, and
means for coupling said first and second tunnel diodes to said third tunnel diode to apply, in succession, said positive-going pulse and said negative-going pulse to switch said third tunnel diode from said low voltage state to said high voltage state and back again.

2. An electrical circuit as claimed in claim 1, wherein said means for switching said first and second tunnel diodes comprises the combination of a differentiator and means for applying a unipolar pulse to said differentiator to produce a positive-going pulse and a negative-going pulse.

3. In combination, a first, second and third tunnel diodes each having high and low voltage positive resistance operating regions, said first tunnel diode being quiescently biased for monostable operation in its said low voltage operating region; said second tunnel diode being quiescently biased for monostable operation in its said high voltage operating region; said third tunnel diode being quiescently biased for bistable operation; first, second, third and fourth tunnel rectifiers each having a direction of easy current flow; said first and second tunnel rectifiers being connected to said first and second tunnel diodes at like and unlike electrodes, respectively; said third and fourth tunnel rectifiers being connected to said first and second tunnel rectifiers, respectively, and being poled in the same direction as said first and second tunnel rectifiers, respectively; said third and fourth tunnel rectifiers being operatively coupled to said third tunnel diode in order to switch said third tunnel diode from said low to said high voltage operating region and then back from said high to said low voltage operating region when said third and fourth tunnel rectifiers conduct in said direction of easy current flow, respectively.

4. In combination, a first, second and third tunnel diodes each having high and low voltage positive resistance operating regions, said first tunnel diode being quiescently biased for monostable operation in said low voltage operating region; said second tunnel diode being quiescently biased for monostable operation in said high voltage operating region; said third tunnel diode being quiescently biased for bistable operation in one of said voltage operating regions and being operatively coupled to said first and second tunnel diodes; first and second tunnel rectifiers being interconnected at unlike electrodes; said first tunnel rectifier being connected at its anode to the anode of said first tunnel diode; said second tunnel rectifier being connected at its cathode to the anode of said second tunnel diode; and means including a differentiating circuit connected to said first and second tunnel rectifiers for switching said first and second tunnel diodes, in succession, to their unstable voltage operating region in an order to switch said third tunnel diode from said one voltage operating region to its other voltage operating region and then from said other voltage operating region back to said one voltage operating region.

References Cited by the Examiner

UNITED STATES PATENTS

| | | | |
|---|---|---|---|
| 2,794,123 | 5/57 | Younker | 328—59 |
| 2,966,599 | 12/60 | Hass | 307—88.5 |
| 3,061,743 | 10/62 | Fukui et al. | 307—88.5 |
| 3,119,936 | 1/64 | Bergman | 307—88.5 |
| 3,125,689 | 3/64 | Miller | 307—88.5 |

OTHER REFERENCES

Chow: Tunnel Diode Logic Circuits, June 24, 1960, Electronics, pages 103 to 107.

Application Engineering Notes "Tunnel Diode Applications," by Todd Hughes, Semiconductor Div. 8, unnumbered pages, page 3 relied on.

ARTHUR GAUSS, *Primary Examiner.*

GEORGE N. WESTBY, *Examiner.*